(12) United States Patent
Yuan et al.

(10) Patent No.: US 12,406,006 B2
(45) Date of Patent: Sep. 2, 2025

(54) GRAPH DATA QUERY

(71) Applicant: Alipay (Hangzhou) Information Technology Co., Ltd., Zhejiang (CN)

(72) Inventors: Lin Yuan, Hangzhou (CN); Jin Jiang, Hangzhou (CN); Zhijun Fu, Hangzhou (CN); Bingpeng Zhu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/398,372

(22) Filed: Dec. 28, 2023

(65) Prior Publication Data

US 2024/0126817 A1 Apr. 18, 2024

Related U.S. Application Data

(63) Continuation of application No. PCT/CN2022/127215, filed on Oct. 25, 2022.

(30) Foreign Application Priority Data

Nov. 2, 2021 (CN) .......................... 202111289086.0

(51) Int. Cl.
*G06F 16/9035* (2019.01)
*G06F 16/51* (2019.01)
(Continued)

(52) U.S. Cl.
CPC ...... *G06F 16/9035* (2019.01); *G06F 16/9024* (2019.01); *G06F 16/51* (2019.01); *G06F 16/535* (2019.01); *G06F 16/5866* (2019.01)

(58) Field of Classification Search
CPC ............. G06F 16/9024; G06F 16/9035; G06F 16/90355; G06F 16/51; G06F 16/535; G06F 16/5866; G06F 16/2458
(Continued)

(56) References Cited

U.S. PATENT DOCUMENTS 9,535,963 B1 1/2017 Shankar et al.
10,152,560 B2 * 12/2018 Potiagalov .............. G06F 16/26
(Continued)

FOREIGN PATENT DOCUMENTS

CN 103823846 5/2014
CN 104899156 9/2015
(Continued)

OTHER PUBLICATIONS

International Preliminary Report on Patentability in International Appln. No. PCT/CN2022/127215, mailed on Jan. 10, 2023, 12 pages (with English translation).
(Continued)

*Primary Examiner* — Shahid A Alam
(74) *Attorney, Agent, or Firm* — Fish & Richardson P.C.

(57) ABSTRACT

A query request is received for querying graph data, including a filtering condition for an attribute value of a first attribute, and used to query a destination edge in a neighboring edge of a first node that satisfies the filtering condition. Graph data includes point data of the first node and edge data of a neighboring edge stored in a single-point data block corresponding to the first node and comprising index data of the edge data used to index a first attribute of the edge data, record the attribute value of the first attribute, and record a storage location of an edge corresponding to the attribute value of the first attribute in the single-point data block. Using the index data and filtering condition, a storage location of the destination edge in the single-point data block is determined and data of the destination edge obtained.

17 Claims, 5 Drawing Sheets

(51) Int. Cl.
*G06F 16/535* (2019.01)
*G06F 16/58* (2019.01)
*G06F 16/901* (2019.01)

(58) Field of Classification Search
USPC .................................................. 707/741, 798
See application file for complete search history.

(56) References Cited

U.S. PATENT DOCUMENTS

| | | | | |
|---|---|---|---|---|
| 10,380,188 | B2* | 8/2019 | Chen | G06F 16/9535 |
| 10,394,891 | B2* | 8/2019 | Chen | G06F 16/9024 |
| 10,599,656 | B1* | 3/2020 | Sharma | G06F 16/9535 |
| 11,120,023 | B2* | 9/2021 | Xia | G06F 16/2315 |
| 11,500,935 | B2* | 11/2022 | Erler | G06F 16/9024 |
| 2015/0026158 | A1* | 1/2015 | Jin | G06F 16/90335 707/769 |
| 2017/0169133 | A1 | 6/2017 | Kim et al. | |
| 2018/0329958 | A1* | 11/2018 | Choudhury | G06F 16/2456 |
| 2020/0226156 | A1* | 7/2020 | Borra | G06F 16/212 |
| 2020/0401625 | A1* | 12/2020 | Wright | G06F 16/90335 |
| 2021/0004374 | A1* | 1/2021 | Xia | G06F 9/4881 |

FOREIGN PATENT DOCUMENTS

| | | | | |
|---|---|---|---|---|
| CN | 106227794 | | 12/2016 | |
| CN | 110737659 | | 1/2020 | |
| CN | 110737659 A | * | 1/2020 | ......... G06F 16/2228 |
| CN | 111241350 | | 6/2020 | |
| CN | 112287182 | | 1/2021 | |
| CN | 112363979 | | 2/2021 | |
| CN | 113722520 | | 11/2021 | |
| CN | 113901279 | | 1/2022 | |
| CN | 114077680 | | 2/2022 | |
| CN | 117290560 | | 12/2023 | |
| CN | 117708384 | | 3/2024 | |
| WO | WO 2021/217497 | | 11/2021 | |
| WO | WO 2023/131218 | | 7/2023 | |

OTHER PUBLICATIONS

International Search Report and Written Opinion in International Appln. No. PCT/CN2022/127215, mailed on May 16, 2024, 15 pages (with English translation).

* cited by examiner

GRAPH DATA QUERY

CROSS-REFERENCE TO RELATED APPLICATIONS

This application is a continuation of PCT Application No. PCT/CN2022/127215, filed on Oct. 25, 2022, which claims priority to Chinese Patent Application No. 202111289086.0, filed on Nov. 2, 2021, and each application is hereby incorporated by reference in its entirety.

TECHNICAL FIELD

This disclosure relates to the field of graph database technologies, and more specifically, to graph data query methods and apparatuses.

BACKGROUND

In the big data era, a node (or referred to as a vertex) in a graph database may include a large quantity of edges. For example, on a social network, a celebrity or a live streamer may have tens of millions of fans. If an edge of a certain node needs to be retrieved (for example, an edge satisfying a certain condition is selected or filtered out), efficiency of retrieving edge data is very important.

To improve efficiency of retrieving the edge data, a global index of the edge data is introduced in a related technology. There are many problems in the global index of the edge data. In one aspect, construction of the global index needs repeated storage of some or even all of the edge data. In another aspect, only a primary key of the edge data can be positioned based on the global index, and after the primary key of the edge data is obtained, the edge data need to be re-searched for based on the primary key of the edge data. As a result, a calculation process is complex, and overheads of a central processing unit (CPU) are large.

SUMMARY

To resolve the above-mentioned problem, this disclosure provides graph data query methods and apparatuses.

According to a first aspect, a graph data query method is provided. The graph data include point data of a first node and edge data of a neighboring edge of the first node, both the point data and the edge data are stored in a single-point data block corresponding to the first node, the single-point data block further includes index data of the edge data, the index data are used to index a first attribute of the edge data, the index data record an attribute value of the first attribute, and the index data further record a storage location of an edge corresponding to the attribute value of the first attribute in the single-point data block. The method includes following: A query request is received, where the query request includes a filtering condition for the attribute value of the first attribute, and the query request is used to query a destination edge that satisfies the filtering condition from the neighboring edge of the first node; a storage location of the destination edge in the single-point data block is determined based on the index data and the filtering condition; and data of the destination edge are obtained based on the storage location of the destination edge in the single-point data block.

Optionally, the index data are located in a first index block, the first index block is any of a plurality of index blocks included in the single-point data block, and the plurality of index blocks are respectively used to index a plurality of attributes of the edge data.

Optionally, the single-point data block further includes positioning data, the positioning data record a storage location of each of the plurality of index blocks in the single-point data block, and before the storage location of the destination edge in the single-point data block is determined based on the index data and the filtering condition, the method further includes following: A storage location of the first index block in the single-point data block is queried based on the positioning data.

Optionally, the positioning data are stored between the point data and the edge data.

Optionally, the edge data are stored in a plurality of edge data blocks.

Optionally, the data in the single-point data block are data in the same file, and the data in the single-point data block are consecutively stored in a storage location of the file.

Optionally, an index name of the index data is an attribute name of the first attribute, and an index value of the first index is the attribute value of the first attribute.

According to a second aspect, a graph data query apparatus is provided. The graph data include point data of a first node and edge data of a neighboring edge of the first node, both the point data and the edge data are stored in a single-point data block corresponding to the first node, the single-point data block further includes index data of the edge data, the index data are used to index a first attribute of the edge data, the index data record an attribute value of the first attribute, and the index data further record a storage location of an edge corresponding to the attribute value of the first attribute in the single-point data block. The apparatus includes: a receiving module, configured to receive a query request, where the query request includes a filtering condition for the attribute value of the first attribute, and the query request is used to query a destination edge that satisfies the filtering condition from the neighboring edge of the first node; a determining module, configured to determine a storage location of the destination edge in the single-point data block based on the index data and the filtering condition; and an acquisition module, configured to obtain data of the destination edge based on the storage location of the destination edge in the single-point data block.

Optionally, the index data are located in a first index block, the first index block is any of a plurality of index blocks included in the single-point data block, and the plurality of index blocks are respectively used to index a plurality of attributes of the edge data.

Optionally, the single-point data block further includes positioning data, the positioning data record a storage location of each of the plurality of index blocks in the single-point data block, and the apparatus further includes: a query module, configured to query a storage location of the first index block in the single-point data block based on the positioning data before the storage location of the destination edge in the single-point data block is determined based on the index data and the filtering condition.

Optionally, the positioning data are stored between the point data and the edge data.

Optionally, the edge data are stored in a plurality of edge data blocks.

Optionally, the data in the single-point data block are data in the same file, and the data in the single-point data block are consecutively stored in a storage location of the file.

Optionally, an index name of the index data is an attribute name of the first attribute, and an index value of the first index is the attribute value of the first attribute.

According to a third aspect, a graph data query apparatus is provided, including a storage, a processor, and a computer program stored in the storage and running on the processor. When executing the computer program, the processor implements the method according to any one of the first aspect or the implementations of the first aspect.

According to a fourth aspect, a computer-readable storage medium is provided. The computer-readable storage medium stores executable code, and when the executable code is executed, the method according to any one of the first aspect or the implementations of the first aspect can be implemented.

According to a fifth aspect, a computer program product is provided, including executable code. When the executable code is executed, the method according to any one of the first aspect or the implementations of the first aspect can be implemented.

In the embodiments of this disclosure, both point data of a single point and edge data of a neighboring edge of the single point are stored in a single-point data block, and the single-point data block further includes index data of the edge data. The index data record location information of the edge data in the single-point data block. In a process of querying the edge data, the location information of the corresponding edge data in the index data can be first positioned based on a filtering condition, and then destination edge data are obtained based on the location information. Because the location information of the edge data is directly stored in the index data, data redundancy is reduced. In addition, a step of calculating the location information of the queried edge data is omitted, thereby reducing CPU overheads.

DESCRIPTION OF EMBODIMENTS

The following clearly and comprehensively describes the technical solutions in the embodiments of this disclosure with reference to the accompanying drawings in the embodiments of this disclosure. Clearly, the described embodiments are merely some rather than all of the embodiments of this disclosure.

With the rise of industries such as retail, finance, e-commerce, the Internet, and the Internet of Things, a quantity of basic data increases geometrically, and it is difficult for conventional relational databases to organize the growing huge quantity of data into a relationship network. Therefore, a batch of databases—graph databases specially used to store and calculate data in the relationship network appear in the industry.

Actually, the graph database originates from Euler and the graph theory, and can also be referred to as a graph-oriented/graph-based database, corresponding to "graph database" in English. A basic meaning of the graph database is to store and query data with a data structure of "graph" instead of a database storing a picture. A data model of the graph database is mainly represented by nodes and relationships (edges), and a key-value pair can also be processed. The graph database has an advantage of quickly resolving a complex relationship problem. The graph database is good at processing a large quantity of, complex, interconnected, and variable network data, and efficiency of the graph database is much higher than the conventional relational databases by hundreds, thousands, or even ten hundred times. In a related technology, representative graph databases are JanusGraph, Neo4j, Hbase, and RocksDB.

It can be understood that a graph can include a finite non-empty set of nodes and a set of edges connected between the nodes. Graph data can include a topology structure, node information, and/or edge information of the graph. The node in the graph sometimes can also be referred to as a vertex or a point. A relationship may exist between any two nodes, and the relationship can be represented by an edge. Two nodes connected by an edge can be referred to as neighboring nodes. For example, if a first node is directly connected to a second node by using an edge, the second node is a neighboring node of the first node; or the second node can be referred to as a one-degree neighbor of the first node. The edge can be referred to as a neighboring edge or a one-degree edge (that is, an edge directly connected to a node) of the first node or the second node. Similarly, if two nodes are separated by a node (that is, the two nodes are not directly connected, but are indirectly connected), one of the two nodes can be referred to as a two-degree neighbor of the other node, and so on.

Each node and edge can have one or more corresponding attributes. The attribute of the node or the edge can be used to describe a property of the node or the edge in an aspect. Using a social network as an example, the node can represent a user who participates in the social network, and the edge can represent mutual interest between users. The attributes corresponding to the node can include, for example, creation time of a user identity, and an age, a gender, and a quantity of fans of the user. The attributes corresponding to the edge can include, for example, identities of two end nodes of the edge and creation time of the edge. The attributes of the node can be recorded in point data corresponding to the node, and the attributes of the edge can be recorded in edge data corresponding to the edge. The attributes of the node or the edge can be set based on an actual application scenario. Implementations are not specifically limited in the embodiments of this disclosure. Both the point data and the edge data have primary keys. Based on the primary keys of the point data or the edge data, a certain node or a certain edge can be uniquely identified in the point data or the edge data. Using the edge data as an example, the primary key of the edge data can be referred to as an edge key. The edge key can include some attributes of the edge data (the attributes constituting the edge key need to uniquely identify edges). For example, the edge key can include the following attribute data of the edge data: "identities of two end nodes of the edge, a type of the edge, and an identity of an egress node" This is because, for edges of the same type, two end nodes of the edges are usually different, so that the two end nodes can uniquely identify the edges.

It can be understood that, the edge in the graph data can have a direction, or can have no direction. An edge with a direction can be referred to as a directed edge, and an edge without a direction can be referred to as an undirected edge. The directed edge can refer to an edge that points from a source node (source, or Src for short) to a destination node (destination, or Dst for short). A graph including a directed edge can be referred to as a directed graph, and a graph including an undirected edge can be referred to as an undirected graph. The embodiments of this disclosure can be applied to the directed graph, or can be applied to the undirected graph.

Data in many scenarios all can be expressed as the graph data. In addition, in different scenarios, many different applications can be implemented based on the graph data. For example, based on the graph data, applications such as financial risk assessment, advertisement recommendation, social relationship prediction, and traffic scheduling can be implemented.

For example, the graph data are used for financial credit assessment. The node can be a user, a financial institution, etc., and information about the node can include data such as user information, a credit score of a user, or financial institution information. The edge can represent a relationship between users or a relationship between a user and a financial institution, for example, the edge can represent a friend relationship or a cooperation relationship. Alternatively, the edge can represent an operation or a behavior of one node on another node, for example, the edge can represent transferring, borrowing, consuming, or saving. Based on the graph, a credit score of another user who has a friend relationship with a user can be assessed or predicted by using a known credit score of the user. Alternatively, based on the graph, a credit score of a user can be assessed through a financial behavior of the user such as transferring or borrowing.

Alternatively, for example, the graph data are used for advertisement recommendation. The node can be a user, an advertisement, a product, etc. Information about the node can include information of a user, product introduction, an advertisement click rate, etc. The edge can be a behavior of a user, for example, purchasing or clicking. Based on the graph, a probability that a user clicks a certain advertisement can be predicted based on a historical product purchase record of a user or behaviors of clicking an advertisement, to implement personalized advertisement recommendation for different users.

As a quantity of basic data increases, a scale of the graph data for storing and calculating data in a relationship network is also increasing. In the previous application scenarios of the graph database, the graph data may include massive point data and edge data. Some nodes in the graph data even have up to tens of millions of neighboring edges (such nodes can also be referred to as ultra-large points). For example, in a financial system, a financial institution may have tens of millions of related users. For another example, on a social network, a celebrity or a live streamer may also have tens of millions of fans. Although there are not many such points, it is easy to encounter such points on a query path because they have a very large quantity of neighbors. For example, it is likely to encounter an ultra-large point when an Internet fraud related to a live streamer is queried based on a transfer relationship. If edges of such a point are traversed and queried, performance impact on a processor or a memory may be very serious. However, in almost all query scenarios, usually not all edges (or referred to as full-scale edges) of an ultra-large point are required, and an edge that satisfies a certain condition needs to be identified from the edges of the ultra-large point. Using a social network as an example, a quantity of male fans or fans aged from 20 to 40 may need to be queried from fans of a live streamer. Using a financial scenario as an example, a user whose daily transfer amount is more than 200,000 yuan may need to be queried from users of a financial institution.

It can be understood that, in the previous application scenarios of the graph database, how to improve efficiency of retrieving edge data is almost a problem that needs to be faced by each graph database. As a quantity of basic data continuously increases, the problem becomes more and more prominent.

In the face of the above-mentioned problem, a worst solution is to perform no processing on edge data of a point. In this case, all edge data of the point need to be read and processed in a memory. As such, a quantity of edge data to be processed is relatively large, and a relatively large memory is occupied. When an ultra-large point is encountered, a quantity of data that need to be processed may exceed a memory capacity. In this case, data need to be written to a disk, and therefore, the disk needs to be accessed frequently in a data processing process. Compared with memory input/output (IC)), disk IO has a relatively long delay, and a large amount of disk IO may also become a system bottleneck, and even lead to a query timeout or a query failure.

To improve efficiency of retrieving the edge data, some related technologies propose a solution of establishing an index for the edge data. However, for edge data retrieval, a mainstream index currently used is a global index. The global index is usually established based on some or all attribute data of the edge data. For example, the global index usually includes two parts: a key and a value. A value of the global index usually includes at least a primary key of the edge data, and even includes attribute data other than the primary key in the edge data. In a process of querying the edge data based on the global index, the value of the global index can be first positioned (that is, the primary key of the edge data is position) based on a filtering condition, and then an edge corresponding to the primary key is identified from the edge data based on the primary key of the edge data.

Storage or an implementation of the global index needs repeated storage of some or even all of the edge data. In addition, only the primary key of the edge data can be positioned based on the global index, and after the primary key of the edge data is obtained, the edge data need to be re-searched for based on the primary key of the edge data. As a result, a calculation process is complex, and CPU overheads are large. Therefore, there are many problems in the global index.

To resolve the problems existing in the global index, in some related technologies, single-point indexes are established for edge data of neighboring edges corresponding to a single point. The single-point indexes can be used to sort the edges based on an index value, and a plurality of indexes can be sorted based on a priority in a tree shape, to improve query efficiency. Edges with the same index value are arranged together. In this case, there is a one-to-many relationship between the index and the edge. It can be understood that, when a many-to-many case occurs, index data can be sorted based on only one sorting rule as a whole, and cannot be sorted as a whole based on a plurality of sorting rules at the same time. For example, assume that the index data include a plurality of index values such as transfer time, a transfer amount, and a transfer currency type, the index data can be first sorted based the transfer time, are sorted based on the transfer amount only when the transfer time is the same, and are sorted based on the transfer currency type when the transfer amounts are the same. In any case, the index data cannot be sorted as a whole based on the transfer time, the transfer amount, and the transfer currency type the at the same time. In this case, a better performance improvement can be achieved only when query is performed based on a sorting rule of the index data. For example, in the previous example, if edge data that satisfy the following filtering condition is expected to query: <transfer time, transfer amount, transfer currency type>, destination edge data can be quickly identified through one time of IO because the filtering condition satisfies a storage sorting rule. However, if the filtering condition is to identify edge data of the transfer currency type, because the edge data are not sorted based on the transfer currency type as a whole, expected destination edge data need to be identified through a plurality of times of IO. It can be seen from the above-mentioned description that such indexing is not flexible enough.

It can be seen from the previous that there are many disadvantages in the method of indexing the edge data provided in the related technology. As a quantity of graph data becomes larger and larger, a more effective edge data indexing method needs to be found.

Figure 1:
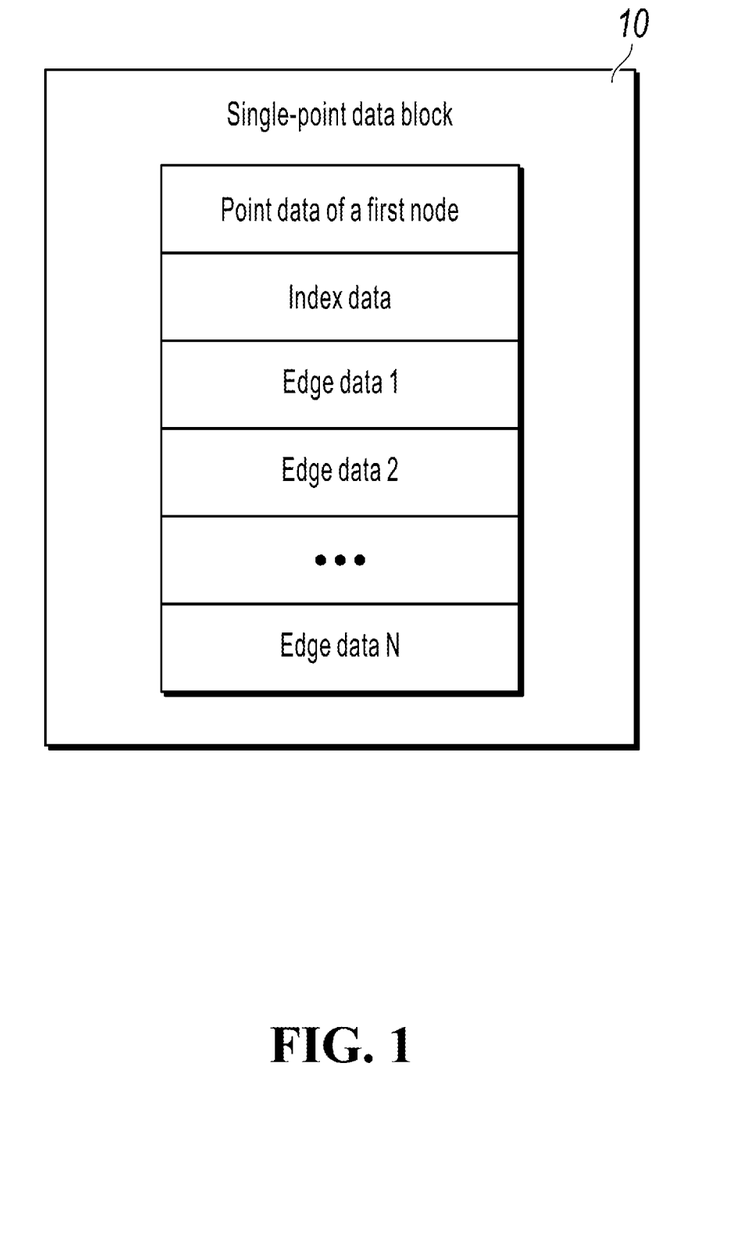
FIG. 1 is a schematic diagram illustrating a structure of a single-point data block, according to one or more embodiments of this disclosure.

With reference to FIG. 1, the following describes in detail a graph database storage structure provided in the embodiments of this disclosure.

A graph database can store data of a graph. The graph can include a plurality of nodes, and each node can include one or more edges. For ease of description, the following mainly uses a first node in the graph as an example for description. It should be understood that the first node can be any node in the graph. Data of another node in the graph can also be stored in the graph database in a way similar to that of the first node.

FIG. 1 shows a storage structure of the first node in the graph database. It can be seen from FIG. 1 that the graph database stores data of the first node in a form of a single-point data block. The first node corresponds to a single-point data block 10. The single-point data block 10 stores point data of the first node and edge data of a neighboring edge of the first node. In other words, in the embodiments of this disclosure, the point data and the edge data of the neighboring edge of the first node are stored together.

If a graph including the first node is an undirected graph, the neighboring edge of the first node can include any neighboring edge connected to the first node; or if the graph including the first node is a directed graph, the neighboring edge of the first node can include a neighboring edge using the first node as a start node (or a source node). Certainly, in some embodiments, the neighboring edge of the first node can also include a neighboring edge using the first node as a destination node.

In some embodiments, the neighboring edge of the first node can be a one-degree neighboring edge of the first node, that is, an edge in the graph that is directly adjacent to the first node. In some other embodiments, the neighboring edge of the first node can also include an N-degree neighboring edge with the first node (N is an integer greater than 1). A value of N can be set based on an actual scenario or actual query needs.

In different scenarios, content of the first node and the point data of the first node can have different meanings. For example, the first node can be a person, or can be an account or a platform. The point data of the first node can include an identity (ID) number, or can include other attribute information. For example, in a social network, when the first node is a person, the point data of the first node can include attribute information such as age, gender, and height. In a fund network, when the first node is an account, attribute information of the node can be, for example, an account name, account creation time, and an account balance. A category and attribute information of the first node are not specifically limited in this disclosure.

Similarly, in different scenarios, the edge data of the first node can include different attribute data. For example, in a social network, when the edge represents a friend relationship, the edge data can include attributes such as chat duration and a quantity of likes. In a fund network, when the edge represents a transfer relationship, the edge data can include attributes such as transfer time and a transfer amount.

Further, in some embodiments, the single-point data block 10 can further include index data of the edge data. The index data can be used to index a first attribute of the edge data of the first node. The first attribute can be any attribute in all attributes of the edge data, and specific content of the first attribute can be set based on actual retrieval needs. For example, the attributes of the edge data include transfer time, a transfer amount, and a transfer currency type. In this case, the first attribute can be any one of the transfer time, the transfer amount, the transfer currency type.

In some embodiments, for example, the index data of the edge data can record location information corresponding to the edge data. The location information corresponding to the edge data can be used to position a location of the edge data of each neighboring edge of the first node in the entire edge data. For example, the location information corresponding to a certain edge can include an offset and a length. The offset can be used to indicate an offset of data corresponding to the edge relative to a start storage location in the single-point data block. The length can be used to indicate a size of storage space occupied by the data corresponding to the edge. Based on the offset and the length, a storage location of the data corresponding to the edge in the single-point data block can be calculated.

Different from the global index of the edge data mentioned above, the index data provided in the embodiments of this disclosure store the location information of the edge data (instead of repeatedly storing a primary key of the edge data). Therefore, the index data generate no data redundancy. Because storage space occupied by the location information is usually very small (for example, storage space needed by "offset+length" mentioned above is very small), a data amount of the index data is greatly decreased, so that a data amount of graph data can be generally decreased.

In some embodiments, the index data can include an index name and an index value. The index name can be an attribute name of the first attribute, and the index value can be the attribute value of the first attribute. For example, the first attribute is a transfer amount. In this case, the index name of the index data can be the transfer amount, and the index value of the index data can be a specific transfer amount value (for example, 200 yuan). For example, the first attribute is a transfer currency type. In this case, the index name of the index data can be the transfer currency type, and the index value of the index data can be RMB or USD.

Optionally, an index block can further include a data type of the index data. The data type of the index data can be, for example, a character type, a Boolean type, an integer type, etc., and is not specifically limited in the embodiments of this disclosure and can be set based on needs.

The single-point data block can be stored in a file. For example, the data in the single-point data block can be consecutively stored in a corresponding storage location in the file, to facilitate indexing and searching. In addition, data in a file are usually not distributed in a plurality of servers. Therefore, even in a distributed storage scenario, the edge data and the index data of the edge data are not stored in different servers, so that overheads of communication between the servers can be reduced.

Figure 2:
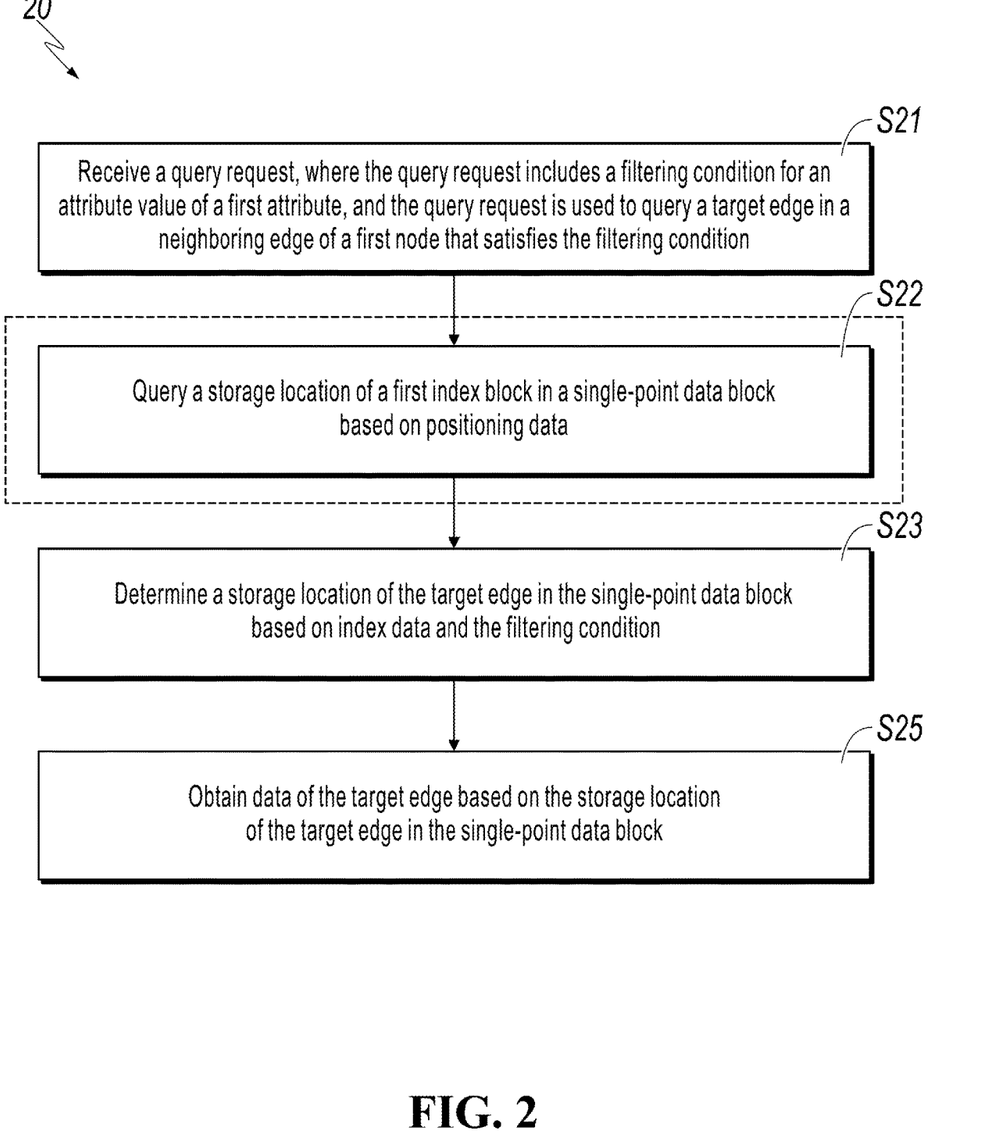
FIG. 2 is a schematic flowchart illustrating a graph data query method, according to one or more embodiments of this disclosure.

Based on the graph data storage structure shown in FIG. 1, one or more embodiments of this disclosure further provide a graph data query method. With reference to FIG. 2, the following describes in detail the graph data query method 20 provided in the embodiments of this disclosure.

Referring to FIG. 2, in step S21, a query request is received. The query request can include a filtering condition for the attribute value of the first attribute, and the query request is used to query a destination edge that satisfies the filtering condition from the neighboring edge of the first node. For example, the query request can be sent by a user of a graph database to the database. The query request can be, for example, an SQL command.

For example, the first attribute is a transfer currency type. In this case, the attribute value of the first attribute can include RMB and USD, and the filtering condition for the attribute value of the first attribute can be RMB.

For example, the first attribute is a transfer amount. In this case, the attribute value of the first attribute can be any value ranging from 0 yuan to 200 yuan, and the filtering condition for the attribute value of the first attribute can be 0 yuan to 200 yuan.

In some embodiments, the query request can further include another filtering condition in addition to the filtering condition for the attribute value of the first attribute. The filtering condition for the attribute value of the first attribute can be combined with another filtering condition based on any logical relationship (such as AND, OR, or XOR).

In step S23, a storage location of the destination edge in the single-point data block is determined based on the index data and the filtering condition.

For example, a part of index data whose index value satisfies the filtering condition can be identified from the index data base on the filtering condition; and then, location information stored in the part of index data is obtained. The location information records the storage location of the destination edge in the single-point data block.

In step S25, data of the destination edge are obtained based on the storage location of the destination edge in the single-point data block. For example, the data of destination edge can be read into a memory; and then, the data of the destination edge can be sent to a user who submits the query request.

Figure 3:
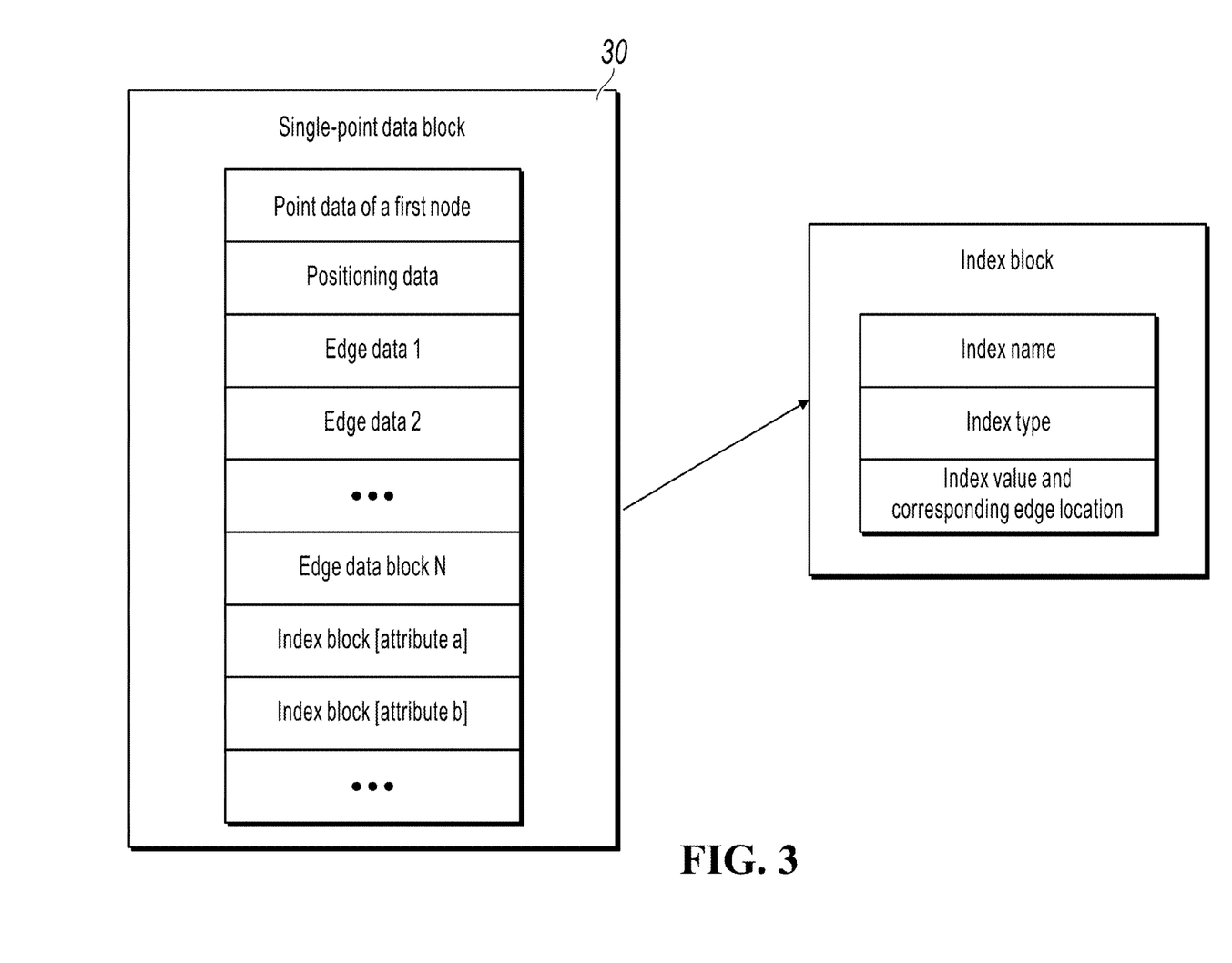
FIG. 3 is a schematic diagram illustrating a structure of another single-point data block, according to one or more embodiments of this disclosure.

The index data for the first attribute mentioned above can be one type of index data stored in the single-point data block. The single-point data block can further store more types of index data. As shown in FIG. 3, the single-point data block 30 can include a plurality of index blocks (an index block for attribute a and an index block for attribute b, etc.). The index data for the first attribute mentioned above can be stored in any one of the index blocks in the single-point data block 30. The plurality of index blocks set in the single-point data block 30 can be respectively used to index a plurality of attributes of the edge data, thereby increasing flexibility of indexing the edge data in the single-point data block 30. For example, the edge data include transfer time, a transfer amount, and a transfer currency type. In this case, index blocks can be respectively established for the transfer time, the transfer amount, and the transfer currency type, and all the index blocks are stored in the single-point data block. As such, a user of the graph database can respectively query the transfer time, the transfer amount, and the transfer currency type, and the query on each attribute has good query performance. In addition, the index data are searched for based on attribute blocks, and each attribute name corresponds to one index block. In a query process, a single-thread query can be performed, or a concurrent query can be performed, to improve flexibility and efficiency of searching for the edge data.

In some embodiments, as shown in FIG. 3, the single-point data block 30 further includes positioning data. The positioning data can be used to position an index block (references can be made to step S22 in FIG. 2). For example, the positioning data can record locations of the plurality of index blocks in the single-point data block 30. For example, the positioning data record a mapping relationship between an attribute and a storage location of an index block (used to index the attribute). When a plurality of index blocks exist, it is convenient to quickly identify a needed index block by using the positioning data. For example, assume that the received query request includes a filtering condition for attribute a, an index block used to index attribute a can be first identified by using the positioning data, and then a storage location of a destination edge that satisfies the filtering condition can be identified based on the index block.

In some embodiments, as shown in FIG. 3, the positioning data can be stored between the point data and the edge data of the first node. After the query request is received, the point data and the positioning data can be first read from the single-point data block through one time of IO, to determine a location of the index block.

As mentioned above, there may be an ultra-large point in the graph data. A data amount of edge data of such a point may be large. Therefore, in some embodiments, the edge data can be divided into a plurality of edge data blocks for storage. The edge data are stored in blocks to facilitate management of the edge data.

To precisely position edge data in a graph database and avoid network overheads, CPU overheads, and data redundancy generated in a searching process, in this disclosure, both point data of a single point and edge data of a neighboring edge of the single point are stored in a single-point data block in the graph database, and the single-point data block further includes index data of the edge data. The index data record location information of the edge data in the single-point data block. In a process of querying the edge data, the location information of the corresponding edge data in the index data can be first queried based on a filtering condition, and then destination edge data are directly positioned based on the location information. Because both the index data and the edge data are stored in one module, and the location information of the edge data is stored in the index data (calculation and query steps are omitted), network overheads, CPU overheads, and data redundancy are reduced.

In some embodiments, during data construction, a secondary index can be established for an edge attribute of a single point based on an index construction rule specified by a user. Implementations are not specifically limited in this disclosure.

According to the graph data storage structure and the graph data query method in this disclosure, the edge data can be quickly read. For example, in a process of querying the edge data, a storage location in the single-point data block can be identified based on a node ID with constant-level time complexity, that is, point data, an attribute name of the edge data, and a location of index data corresponding to the edge can be obtained from the single-point data block through one time of IO, and can be obtained through parsing. Then, all attribute names can be traversed to obtain index data block locations corresponding to the attribute names, and the index data block locations are read through one time of IO and parsed. Next, a data location of an edge that satisfies a requirement is filtered out based on a filtering rule and the index data obtained in the previous step. Finally, the edge data can be directly read and parsed based on the location of the edge data.

It can be understood that, the data storage structure and the data query method mentioned above can be and is unnecessarily applied to a perfect hash store (PhStore) based system.

It can be understood that, the data storage structure and the data query method mentioned above are not only applicable to a system with data stored on a disk, but also applicable to a system with data stored in a memory.

It can be understood that, the data storage structure and the data query method mentioned above are not only applicable to a graph data system, but also applicable to a key-value system.

It can be understood that, the data storage structure and the data query method mentioned above not only can establish an index for the edge attribute, but also can establish an index for the point data.

It can be understood that, the data query method mentioned above is not limited to querying asynchronous input/output (AIO), and can also be used to query synchronous input/output (SIO).

The graph data storage structure and the graph data query method in this disclosure are described above in detail with reference to FIG. 1 to FIG. 3. Apparatus embodiments of this disclosure are described below with reference to FIG. 4 and FIG. 5. It should be understood that, the description of the apparatus embodiments corresponds to the description of the method embodiments. Therefore, for parts that are not described in detail, references can be made to the previous method embodiments.

Figure 4:
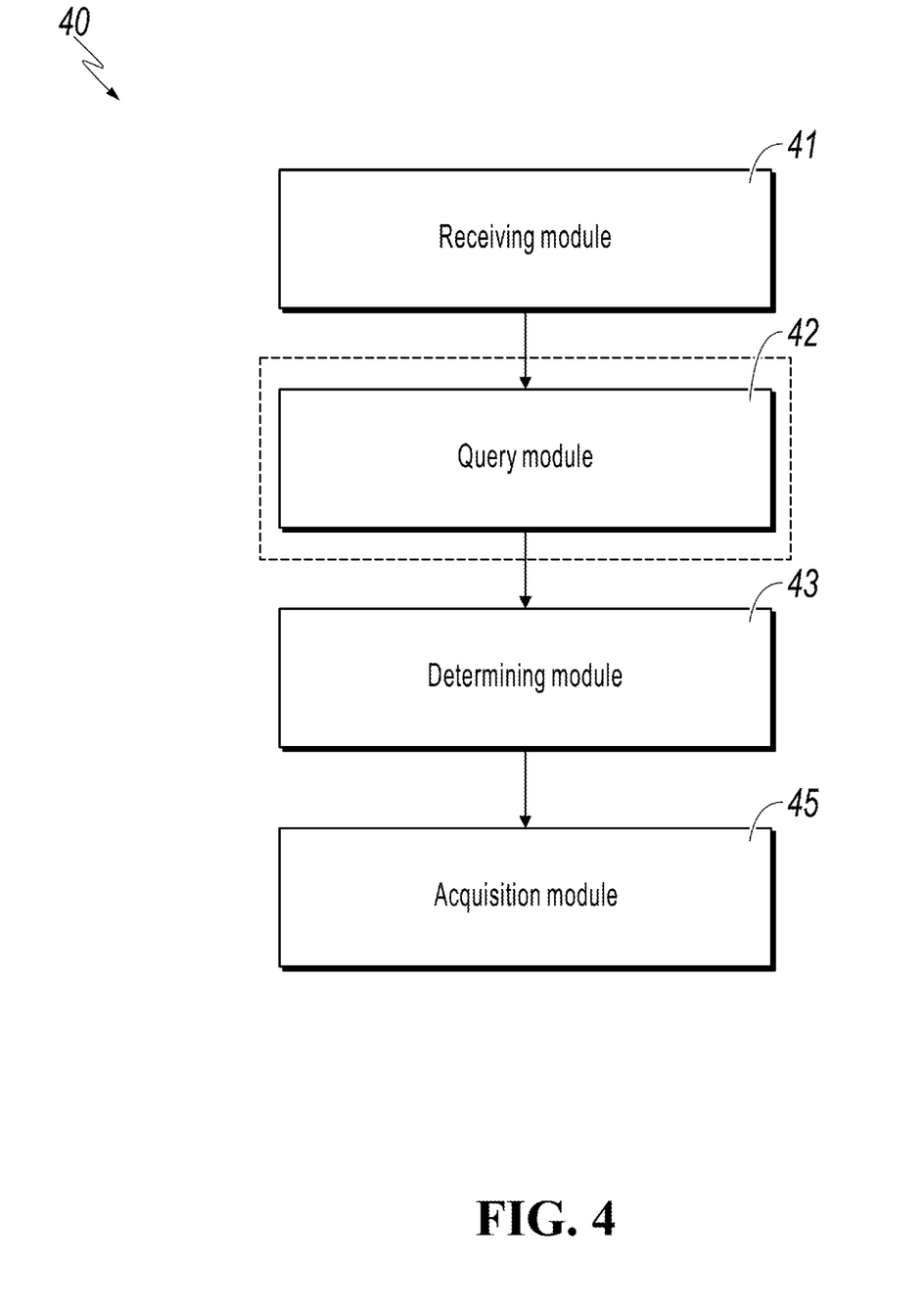
FIG. 4 is a schematic diagram illustrating a structure of a graph data query apparatus, according to one or more embodiments of this disclosure.

FIG. 4 is a schematic diagram illustrating a structure of a graph data query apparatus, according to one or more embodiments of this disclosure. The graph data include point data of a first node and edge data of a neighboring edge of the first node, both the point data and the edge data are stored in a single-point data block corresponding to the first node, the single-point data block further includes index data of the edge data, the index data are used to index a first attribute of the edge data, the index data record an attribute value of the first attribute, and the index data further record a storage location of an edge corresponding to the attribute value of the first attribute in the single-point data block. The apparatus 40 can include a receiving module 41, a determining module 43, and an acquisition module 45.

The receiving module 41 can be configured to receive a query request, where the query request includes a filtering condition for the attribute value of the first attribute, and the query request is used to query a destination edge that satisfies the filtering condition from the neighboring edge of the first node.

The determining module 43 can be configured to determine a storage location of the destination edge in the single-point data block based on the index data and the filtering condition.

The acquisition module 45 can obtain data of the destination edge based on the storage location of the destination edge in the single-point data block.

Optionally, the index data are located in a first index block, the first index block is any of a plurality of index blocks included in the single-point data block, and the plurality of index blocks are respectively used to index a plurality of attributes of the edge data.

Optionally, the single-point data block further includes positioning data, the positioning data record a storage location of each of the plurality of index blocks in the single-point data block, and the apparatus further includes: a query module 42, configured to query a storage location of the first index block in the single-point data block based on the positioning data before the storage location of the destination edge in the single-point data block is determined based on the index data and the filtering condition.

Optionally, the positioning data are stored between the point data and the edge data.

Optionally, the edge data are stored in a plurality of edge data blocks.

Optionally, the data in the single-point data block are data in the same file, and the data in the single-point data block are consecutively stored in a storage location of the file.

Optionally, an index name of the index data is an attribute name of the first attribute, and an index value of the first index is the attribute value of the first attribute.

Figure 5:
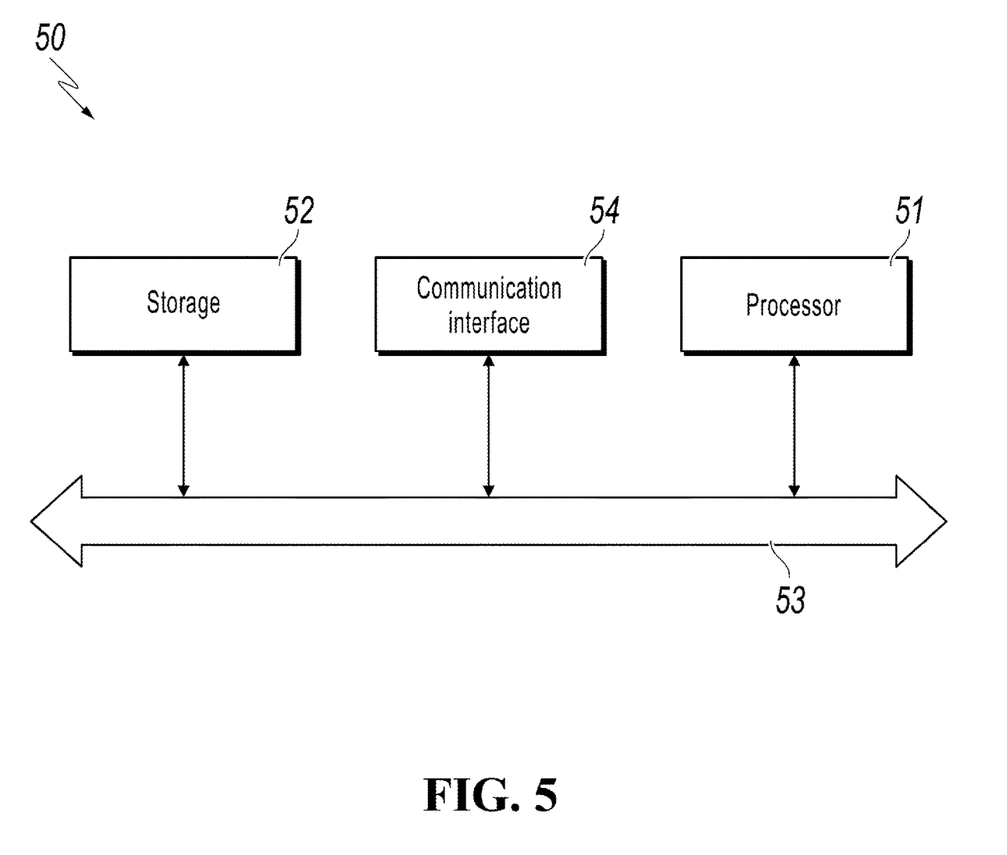
FIG. 5 is a schematic diagram illustrating a structure of another graph data query apparatus, according to one or more embodiments of this disclosure.

One or more embodiments of this disclosure further provide a graph data query apparatus, for example, the apparatus can be a computer, a server, etc. FIG. 5 is a schematic diagram illustrating a structure of a graph data query apparatus 50, according to one or more embodiments of this disclosure. The graph data query apparatus 50 can include a processor 51, a storage 52, and a bus 53. The processor 51 is connected to the storage 52 through the bus 53, and the processor 51 is configured to execute an executable module, such as a computer program, stored in the storage 52.

The processor 51 can be, for example, an integrated circuit chip, and has a signal processing capability. In an implementation process, the steps of the graph data query method can be completed by using a hardware integrated logic circuit in the processor 51 or instructions in a form of software. The processor 51 can be a general-purpose processor, including a CPU, a network processor (NP), etc.; or can be a digital signal processor (DSP), an application specific integrated circuit (ASIC), a field programmable gate array (FPGA) or another programmable logic device, a discrete gate or a transistor logic device, or a discrete hardware component.

For example, the storage 52 can include a random access memory (RAM), or can include a nonvolatile memory, for example, at least one disk storage.

The bus 53 can be an industry standard architecture (ISA) bus, a peripheral component interconnect (PCI) bus, an extended industry standard architecture (EISA) bus, etc. In FIG. 5, only one two-way arrow is used to represent the bus 53, but it does not mean that there is only one bus 130 or only one type of bus 53.

The storage 52 is configured to store a program, for example, a program corresponding to the graph data query apparatus. The graph data query apparatus 50 can include at least one software functional module stored in the storage 52 in a form of software or firmware or solidified in an operating system (OS) of the graph data query apparatus 50. After receiving an execution instruction, the processor 51 executes the program to implement the above-mentioned graph data query method.

In some embodiments, the graph data query apparatus 50 provided in this disclosure can further include a communication interface 54. The communication interface 54 is connected to the processor 51 through a bus.

It should be understood that, the structure shown in FIG. 5 is merely a schematic diagram of a partial structure of the graph data query apparatus 50. The graph data query apparatus 50 can further include more or less components than those shown in FIG. 5, or have a configuration different from that shown in FIG. 5. The components shown in FIG. 5 can be implemented by hardware, software, or a combination thereof.

The graph data method provided in the embodiments of this disclosure can be but is unnecessarily applied to the graph data query apparatus shown in FIG. 5.

It should be understood that, in the embodiments of this disclosure, sequence numbers of the processes do not mean execution sequences. The execution sequences of the processes should be determined based on functions and internal logic of the processes, and do not constitute any limitation on the implementation processes of the embodiments of this disclosure.

In the several embodiments provided in this disclosure, it should be understood that the disclosed system, apparatus, and method can be implemented in other ways. For example, the apparatus embodiments described above are merely examples. For example, division of the units is merely logical function division, and there can be another division way in actual implementation. For example, a plurality of units or components can be combined or integrated into another system, or some features can be ignored or not performed. In addition, the displayed or discussed mutual couplings or direct couplings or communication connections can be implemented through some interfaces. The indirect couplings or communication connections between the apparatuses or units can be implemented in an electrical form, a mechanical form, or another form.

The units described as separate parts may or may not be physically separate, and parts displayed as units may or may not be physical units, that is, may be located in one place, or may be distributed on a plurality of network units. Some or all of the units can be selected based on actual needs to achieve the objectives of the solutions in the embodiments.

In addition, functional units in the embodiments of this disclosure can be integrated into one processing unit, each of the units can exist alone physically, or two or more units can be integrated into one unit.

All or some of the above-mentioned embodiments can be implemented by software, hardware, firmware, or any combination thereof. When software is used for implementation, the embodiments can be entirely or partially implemented in a form of a computer program product. The computer program product includes one or more computer instructions. When the computer program instructions are loaded and executed on a computer, all or some of the procedures or functions according to the embodiments of this disclosure are generated. The computer can be a general-purpose computer, a dedicated computer, a computer network, or another programmable apparatus. The computer instructions can be stored in a computer-readable storage medium or can be transmitted from one computer-readable storage medium to another computer-readable storage medium. For example, the computer instructions can be transmitted from one website, computer, server, or data center to another website, computer, server, or data center in a wired (for example, a coaxial cable, an optical fiber, or a digital subscriber line (DSL)) or wireless (for example, infrared, radio, or microwave) way. The computer-readable storage medium can be any available medium accessible by a computer, or a data storage device, such as a server or a data center, that includes one or more available media. The available medium can be a magnetic medium (for example, a floppy disk, a hard disk, or a magnetic tape), an optical medium (for example, a digital video disc (DVD)), a semiconductor medium (for example, a solid state disk (SSD)), etc.

The previous descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A computer-implemented method for querying graph data, comprising:
   receiving a query request, wherein the query request comprises a filtering condition for an attribute value of a first attribute, and the query request is used to query a destination edge in a neighboring edge of a first node that satisfies the filtering condition, wherein:
   graph data comprises point data of the first node and edge data of a neighboring edge of the first node;
   both point data and edge data is stored in a single-point data block corresponding to the first node;
   the single-point data block comprises index data of the edge data;
   the index data is used to index a first attribute of the edge data;
   the index data records the attribute value of the first attribute;
   the index data further records a storage location of an edge corresponding to the attribute value of the first attribute in the single-point data block; and
   the index data is located in a first index block, the first index block is any of a plurality of index blocks comprised in the single-point data block, and the plurality of index blocks are respectively used to index a plurality of attributes of the edge data, the single-point data block comprises positioning data, and wherein the positioning data records a storage location of each of the plurality of index blocks in the single-point data block;
   determining, based on the index data and the filtering condition, a storage location of the destination edge in the single-point data block; and
   obtaining, based on the storage location of the destination edge in the single-point data block, data of the destination edge.

2. The computer-implemented method of claim 1, comprising:
   before determining, based on the index data and the filtering condition, a storage location of the destination edge in the single-point data block:

querying, based on the positioning data, a storage location of the first index block in the single-point data block.

3. The computer-implemented method of claim 2, wherein:
the positioning data is stored between the point data and the edge data.

4. The computer-implemented method of claim 1, wherein:
the edge data is stored in a plurality of edge data blocks.

5. The computer-implemented method of claim 1, wherein:
the data in the single-point data block are data in a same file; and
the data in the single-point data block is consecutively stored in a storage location of the same file.

6. The computer-implemented method of claim 1, wherein:
an index name of the index data is an attribute name of the first attribute; and
an index value of a first index is the attribute value of the first attribute.

7. A non-transitory, computer-readable medium storing one or more instructions executable by a computer system to perform one or more operations for querying graph data, comprising:
receiving a query request, wherein the query request comprises a filtering condition for an attribute value of a first attribute, and the query request is used to query a destination edge in a neighboring edge of a first node that satisfies the filtering condition, wherein:
graph data comprises point data of the first node and edge data of a neighboring edge of the first node;
both point data and edge data is stored in a single-point data block corresponding to the first node;
the single-point data block comprises index data of the edge data;
the index data is used to index a first attribute of the edge data;
the index data records the attribute value of the first attribute;
the index data further records a storage location of an edge corresponding to the attribute value of the first attribute in the single-point data block; and
the index data is located in a first index block, the first index block is any of a plurality of index blocks comprised in the single-point data block, and the plurality of index blocks are respectively used to index a plurality of attributes of the edge data, the single-point data block comprises positioning data, and wherein the positioning data records a storage location of each of the plurality of index blocks in the single-point data block;
determining, based on the index data and the filtering condition, a storage location of the destination edge in the single-point data block; and
obtaining, based on the storage location of the destination edge in the single-point data block, data of the destination edge.

8. The non-transitory, computer-readable medium of claim 7, comprising:
before determining, based on the index data and the filtering condition, a storage location of the destination edge in the single-point data block:
querying, based on the positioning data, a storage location of the first index block in the single-point data block.

9. The non-transitory, computer-readable medium of claim 8, wherein:
the positioning data is stored between the point data and the edge data.

10. The non-transitory, computer-readable medium of claim 7, wherein:
the edge data is stored in a plurality of edge data blocks.

11. The non-transitory, computer-readable medium of claim 7, wherein:
the data in the single-point data block are data in a same file; and
the data in the single-point data block is consecutively stored in a storage location of the same file.

12. The non-transitory, computer-readable medium of claim 7, wherein:
an index name of the index data is an attribute name of the first attribute; and
an index value of a first index is the attribute value of the first attribute.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for querying graph data, comprising:
receiving a query request, wherein the query request comprises a filtering condition for an attribute value of a first attribute, and the query request is used to query a destination edge in a neighboring edge of a first node that satisfies the filtering condition, wherein:
graph data comprises point data of the first node and edge data of a neighboring edge of the first node;
both point data and edge data is stored in a single-point data block corresponding to the first node;
the single-point data block comprises index data of the edge data;
the index data is used to index a first attribute of the edge data;
the index data records the attribute value of the first attribute;
the index data further records a storage location of an edge corresponding to the attribute value of the first attribute in the single-point data block; and
the index data is located in a first index block, the first index block is any of a plurality of index blocks comprised in the single-point data block, and the plurality of index blocks are respectively used to index a plurality of attributes of the edge data, the single-point data block comprises positioning data, and wherein the positioning data records a storage location of each of the plurality of index blocks in the single-point data block;
determining, based on the index data and the filtering condition, a storage location of the destination edge in the single-point data block; and
obtaining, based on the storage location of the destination edge in the single-point data block, data of the destination edge.

14. The computer-implemented system of claim 13, comprising:
before determining, based on the index data and the filtering condition, a storage location of the destination edge in the single-point data block:

querying, based on the positioning data, a storage location of the first index block in the single-point data block.

15. The computer-implemented system of claim 14, wherein:
   the positioning data is stored between the point data and the edge data.

16. The computer-implemented system of claim 13, wherein:
   the edge data is stored in a plurality of edge data blocks.

17. The computer-implemented system of claim 13, wherein:
   the data in the single-point data block are data in a same file; and
   the data in the single-point data block is consecutively stored in a storage location of the same file.

* * * * *